United States Patent
Seo

(10) Patent No.: US 10,761,953 B2
(45) Date of Patent: Sep. 1, 2020

(54) MEMORY SYSTEM AND METHOD FOR OPERATING THE SAME

(71) Applicant: SK hynix Inc., Gyeonggi-do (KR)

(72) Inventor: Yun Chan Seo, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 165 days.

(21) Appl. No.: 15/980,417

(22) Filed: May 15, 2018

(65) Prior Publication Data
US 2019/0114239 A1    Apr. 18, 2019

(30) Foreign Application Priority Data

Oct. 17, 2017    (KR) .................. 10-2017-0134676

(51) Int. Cl.
*G06F 11/00*    (2006.01)
*G06F 11/20*    (2006.01)
*G06F 3/06*    (2006.01)

(52) U.S. Cl.
CPC ........ *G06F 11/2094* (2013.01); *G06F 3/0619* (2013.01); *G06F 3/0659* (2013.01); *G06F 3/0679* (2013.01); *G06F 2201/82* (2013.01); *G06F 2201/85* (2013.01)

(58) Field of Classification Search
CPC ............. G06F 11/2094; G06F 11/2002; G06F 11/2051; G06F 11/2053; G06F 3/0619; G06F 3/0659; G06F 3/0679; G06F 3/0614; G06F 3/0655; G06F 3/0656; G06F 2201/82; G06F 2201/85; G06F 9/546
See application file for complete search history.

(56) References Cited

U.S. PATENT DOCUMENTS

2009/0157950 A1*  6/2009 Selinger .................. G06F 12/08
                                                               711/103
2018/0018221 A1*  1/2018 Magro ................. G06F 13/1626

FOREIGN PATENT DOCUMENTS

KR    1020160144560    12/2016
KR    1020170001235    1/2017

* cited by examiner

*Primary Examiner* — Anthony J Amoroso
(74) *Attorney, Agent, or Firm* — IP & T Group LLP

(57) ABSTRACT

There are provided a memory system and a method for operating the same. A memory system includes: a controller for queuing a plurality of commands and outputting control signals in response to the plurality of queued commands; and a memory device for performing a program operation in response to the control signals, wherein, when the program operation fails, the controller holds the plurality of queued commands.

19 Claims, 5 Drawing Sheets

MEMORY SYSTEM AND METHOD FOR OPERATING THE SAME

CROSS-REFERENCE TO RELATED APPLICATION

The present application claims priority under 35 U.S.C. § 119(a) to Korean patent application number 10-2017-0134676, filed on Oct. 17, 2017, which is incorporated herein by reference in its entirety.

BACKGROUND

1. Field of Invention

Various exemplary embodiments of the present disclosure generally to relate to an electronic device. Particularly, the embodiments relate to a memory system including a nonvolatile memory device and a method for operating the memory system.

2. Description of the Related Art

The computer environment has evolved to the point where it is ubiquitous. That is, computing systems can be used anywhere and anytime. This promotes increased usage of portable electronic devices, such as mobile phones, digital cameras, notebook computers, and the like. Such portable electronic devices may generally include a memory system with a memory device, i.e., a data storage device. In such portable electronic devices, the data storage device is used as a main memory device or an auxiliary memory device.

A data storage device employed as a memory device has excellent stability and durability, high information access speed, and low power consumption, since there is no mechanical driving part. In memory systems having such advantages, the data storage device includes a universal serial bus (USB) memory device, memory cards having various interfaces, a solid state drive (SSD), and the like.

SUMMARY

Embodiments provide a memory system and a method for operating the same, which can improve the reliability of data by holding a read command waiting when a program operation of the memory system fails and then performing a recovery operation.

According to an aspect of the present disclosure, there is provided a memory system including: a controller configured to queue a plurality of commands and output control signals in response to the plurality of queued commands; and a memory device configured to perform a program operation in response to the control signals, wherein, when the program operation fails, the controller holds the plurality of queued commands.

According to an aspect of the present disclosure, there is provided a memory system including: a controller configured to queue a plurality of commands and output control signals in response to the plurality of queued commands; and a memory device configured to perform a program operation in response to the control signals, wherein, when the program operation fails, the memory device stores data in a new memory block by performing a recovery operation, wherein the controller holds the plurality of queued commands and then corrects a position corresponding to a read command among the plurality of commands to a position of the new memory block.

According to an aspect of the present disclosure, there is provided a method for operating a memory system, the method including: queuing a plurality of commands input from a host in a controller; generating control signals according to an order of the plurality of commands queued in the controller, and performing operations of a memory device, including a program operation, based on the control signals; and when a program operation among the operations fails, holding the generating of the control signals and performing a recovery operation of the program operation.

According to an aspect of the present disclosure, there is provided an electronic device comprising: a controller including a processor and a NAND flash controller; the processor being configured to queue a plurality of commands input from an external source in the NAND flash controller, and the NAND flash controller being configured to generate and output control signals in response to the plurality of queued commands; and a memory configured to perform a program operation on a select unit of data in response to the control signals, and after the program operation is completed, perform a status check operation to determine whether the program operation was successfully performed; wherein, when the status check operation indicates that the program operation was not successfully performed, the memory outputs a program status signal indicating that the program operation was not successfully performed, and in response to the program status signal, the NAND flash controller holds the operation of generating and outputting the control signals.

BRIEF DESCRIPTION OF THE DRAWINGS

Example embodiments will now be described in more detail with reference to the accompanying drawings; however, such embodiments should not be construed as limiting. Rather, these embodiments are provided to facilitate a thorough and complete disclosure, and to fully convey the scope of the example embodiments to those skilled in the art.

In the drawing figures, dimensions may not be to scale for clarity of illustration. Moreover, it is to be understood that when an element is referred to as being "between" two elements, it may be the only element between the two elements, or multiple intervening elements may be present. Like reference numerals refer to like elements throughout.

DETAILED DESCRIPTION

In the following detailed description, exemplary embodiments of the present disclosure are described. Such embodiments are described by way of illustration, not limitation. As those skilled in the art would realize from the following description, the described embodiments may be modified in various different ways, without departing from the spirit or scope of the present disclosure. Accordingly, the following description, along with the referenced drawings, are to be regarded as illustrative in nature and not restrictive.

Throughout the specification, when an element is referred to as being "connected" or "coupled" to another element, it can be directly connected or coupled to the another element or be indirectly connected or coupled to the another element with one or more intervening elements interposed therebetween. In addition, when an element is referred to as "including" a component, such expression indicates that the element may further include one or more additional components instead of excluding additional component(s), unless clearly stated otherwise.

Figure 1:
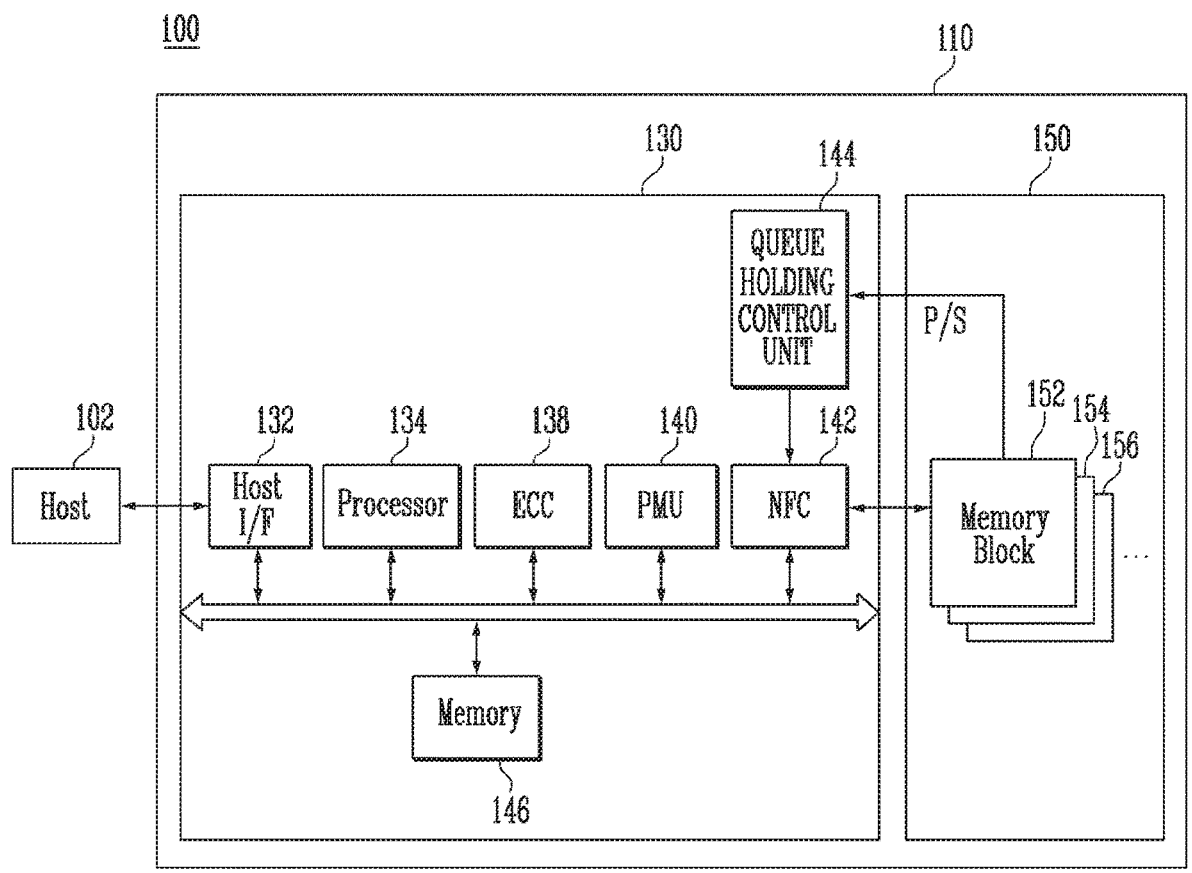
FIG. 1 is a diagram illustrating an example of a data processing system including a memory system in accordance with an embodiment of the present disclosure.

FIG. 1 is a diagram illustrating an example of a data processing system including a memory system in accordance with an embodiment of the present disclosure.

Referring to FIG. 1, the data processing system 100 may include a host 102 and a memory system 110.

The host 102 may include portable electronic devices such as mobile phones, MP3 players, and laptop computers or electronic devices such as desktop computers, game consoles, TVs, and projectors.

Memory system 110 operates in response to a request of the host 102, which may access data stored by the memory system 110. Memory system 110 may be used as a main memory device or auxiliary memory device of the host 102. In one or more embodiments of the present disclosure, the memory system 110 may be implemented with any of various types of storage devices in accordance with a host interface protocol coupled to the host 102. For example, the memory system 110 may be implemented with any of various types of storage devices such as a solid state drive (SSD), a multi-media card (MMC), embedded MMC (eMMC), reduced size MMC (RS-MMC) or micro-MMC, a secure digital (SD) card, mini-SD or micro-SD, an universal serial bus (USB) storage device, a universal flash storage (UFS) device, a compact flash (CF) card, a smart media (SMC) card, and a memory stick.

In addition, the storage devices for implementing the memory system 110 may be classified into (i) volatile memory devices such as dynamic random access memory (DRAM) and static random access memory (SRAM), and (ii) non-volatile memory devices such as read only memory (ROM), mask read only memory (MROM), programmable read only memory (PROM), electrically programmable read only memory (EPROM), electrically erasable and programmable read only memory (EEPROM), ferromagnetic random access memory (FRAM), phase change random access memory (PRAM), magnetic random access memory (MRAM), resistive random access memory (RRAM), and flash memory.

Also, the memory system 110 may include a memory device 150 that stores data accessed by the host 102 and a controller 130 that controls data to be stored in the memory device 150.

In one or more embodiments of the present disclosure, the controller 130 and the memory device 150 may be integrated into one semiconductor device. As an example, the controller 130 and the memory device 150 may be integrated as a single semiconductor device to constitute an SSD. When the memory system 110 is used as the SSD, the operating speed of the host 102 coupled to the memory system 110 can be remarkably improved.

For example, the controller 130 and the memory device 150 may be integrated as a single semiconductor device to constitute a memory card. As another example, the controller 130 and the memory device 150 may be integrated as a single semiconductor device, to constitute a memory card such as a PC card (personal computer memory card international association (PCMCIA)), a compact flash (CF) card, a smart media card (SM or SMC), a memory stick, a multimedia card (MMC, RS-MMC or MMCmicro), an SD card (SD, mini-SD, micro-SD or SDHC), or a universal flash storage (UFS).

To provide yet another example, the memory system 110 may constitute one of various components of an electronic device such as a computer, an ultra mobile PC (UMPC), a workstation, a net-book, a personal digital assistant (PDA), a portable computer, a web tablet, a wireless phone, a mobile phone, a smart phone, an e-book, a portable multimedia player (PMP), a portable game console, a navigation system, a black box, a digital camera, a 3-dimensional television, a digital audio recorder, a digital audio player, a digital picture recorder, a digital picture player, a digital video recorder, a digital video player, a storage that constitutes a data center, a device capable of transmitting/receiving information in a wireless environment, one of various electronic devices that constitute a home network, one of various electronic devices that constitute a computer network, one of various electronic devices that constitute a telemetics network, an RFID device, or one of various components that constitute a computing system.

Memory device 150 of the memory system 110 retains stored data even when power is not supplied. Memory system 110 stores data provided from the host 102 through a write operation, and provides stored data to the host 102 through a read operation.

In one or more embodiments of the present disclosure, memory device 150 may include a plurality of memory blocks 152, 154, and 156, each of which includes a plurality of pages. In addition, each of the pages includes a plurality of memory cells coupled to a plurality of word lines. Also, the memory device 150 may include a plurality of planes in which the plurality of memory blocks 152, 154, and 156 are respectively included. In particular, the memory device 150 may include a plurality of memory dies in which the plurality of planes are respectively included. The memory device 150 may be a nonvolatile memory device, e.g., a flash memory. In such example, the flash memory may have a three-dimensional stack structure.

An exemplary structure of the memory device 150 including a three-dimensional stack structure of the memory device 150 is described in more detail with reference to FIGS. 2 to 4.

The controller 130 of the memory system 110 controls the memory device 150 in response to a request from the host 102. The controller 130 provides data read from the memory device 150 to the host 102, and stores data provided from the host 102 in the memory device 150. To this end, the controller 130 controls read, write, program, and erase operations of the memory device 150.

The controller 130 may include a host interface (host I/F) unit 132, a processor 134, an error correction code (ECC) unit 138, a power management unit (PMU) 140, a memory interface 142 such as a NAND flash controller (NFC), a queue holding controller 144, and a memory 146. The memory interface 142 and the queue holding controller 144 may be separate components as shown, for example, in FIG.

1. However, other arrangements are possible. For example, the queue holding controller 144 may be included in the memory interface 142.

The host I/F unit 132 may process commands and data of the host 102 and may communicate with the host 102 through at least one of various interface protocols, such as a universal serial bus (USB) protocol, a multimedia card (MMC) protocol, a peripheral component interconnection (PCI) protocol, a PCI-Express (PCI-E) protocol, an advanced technology attachment (ATA) protocol, a Serial-ATA protocol, a Parallel-ATA protocol, a small computer system interface (SCSI) protocol, an enhanced small disk interface (ESDI) protocol, and an integrated drive electronics (IDE) protocol.

When data stored in the memory device 150 is read, the ECC unit 138 detects and corrects any error included in the read data. In other words, the ECC unit 138 may perform ECC decoding on the data read from the memory device 150, determine whether the ECC decoding has succeeded, output an instruction signal based on the determined result, and correct error bits of the read data by using parity bits generated in an ECC encoding process. However, if the number of error bits is greater than or equal to a correctable error bit threshold value, ECC unit 138 cannot correct the error bits, and thus may output an error correction fail signal indicating that the error bits are not corrected.

The processor 134 controls overall operations of the memory system 110, including a write or read operation on the memory device 150 in response to a write or read request from the host 102. For example, the processor 134 drives firmware such as a flash translation layer (hereinafter referred to as 'FTL') to control the overall operations of memory system 110. Processor 134 may be implemented with a microprocessor, a central processing unit (CPU), or the like. Also, the processor 134 may queue commands received from the host 102 in the memory interface 142 by allowing the commands to be arranged in an order of priority. Also, the processor 134 controls the memory device 150 to perform a recovery operation when it is determined that a program operation of the memory device 150 has failed. Also, the processor 134 may search for a read command having an address corresponding to that at which the program operation failed by reading commands held in the memory interface 142. When the read command is identified, the processor 134 may correct the address of the read command to a recovered address and queue commands including the corrected read command in the memory interface 142.

The ECC unit 138 may perform error correction by using coded modulation including low density parity check (LDPC) code, Bose, Chaudhuri, and Hocquenghem (BCH) code, turbo code, Reed-Solomon code, convolution code, recursive systematic code (RSC), trellis-coded modulation (TCM), block coded modulation, Hamming code, and the like, but the present disclosure is not limited to such error correction techniques. Rather, any other suitable error correction techniques may be used. Also, the ECC unit 138 may include a circuit, system, or device for error correction.

The PMU 140 provides and manages power of the controller 130, i.e., power of components included in the controller 130.

The memory interface 142 is a memory interface that performs interfacing between the controller 130 and the memory device 150 to control the memory device 150 in response to a request from the host 102. When the memory device 150 is a flash memory, particularly a NAND flash memory, the memory interface 142 generates a control signal of the memory device 150 and processes data based on the control of the processor 134.

Also, the memory interface 142 may store a plurality of commands queued by the processor 134. The memory interface 142 may generate control signals corresponding to the queued commands sequentially in response to the commands and output or transmit the generated control signals to the memory device 150. Also, the memory interface 142 may stop generating and transmitting the control signals by holding the queued commands, or re-perform the previously-stopped generating and transmitting operation of the control signals by releasing the held commands.

The queue holding controller 144 may selectively hold a command output operation or release the hold of the command output operation in response to a status check operation result P/S in the program operation of the memory device 150. For example, the queue holding controller 144 holds the command output operation of the memory interface 142 when it is determined that the program operation of the memory device 150 has failed, and releases the held command output operation after the memory interface 142 stores commands newly queued by the processor 134.

The memory 146 of the memory system 110 and the controller 130 may operate to store data for driving the memory system 110 and the controller 130. For example, when the controller 130 controls operations such as a read operation, a write operation, a program operation, or an erase operation, the controller 130 stores data required to perform the operations in the memory 146.

The memory 146 may be implemented with a volatile memory, such as a static random access memory (SRAM), a dynamic random access memory (DRAM), or the like. Also, the memory 146 stores data required to perform operations such as data write and read operations between the host 102 and the memory device 150 and data when the operations such as data write and read operations are performed. In order to store such data, the memory 146 may include a program memory, a data memory, a write buffer/cache, a read buffer/cache, a map buffer/cache, and the like.

The controller 130 may perform an operation requested from the host 102 in the memory device 150 through the processor 134 implemented with the microprocessor, the CPU, or the like. For example, the controller 130 performs, together with the memory device 150, a command operation corresponding to a command received from the host 102. In this example, the controller 130 may perform a foreground operation as a command operation corresponding to the command received from the host 102.

Also, the controller 130 may perform a background operation on the memory device 150 through the processor 134 implemented with the microprocessor, the CPU, or the like. For example, the background operation on the memory device 150 may include an operation of performing a process by copying data stored in an arbitrary memory block in the memory blocks 152, 154, and 156 of the memory device 150 to another arbitrary memory block, e.g., a garbage collection operation, an operation of performing a process by swapping between the memory blocks 152, 154, and 156 of the memory device 150 or between data stored in the memory blocks 152, 154, and 156, e.g., a wear leveling operation, an operation of allowing map data stored in the controller 130 to be stored in the memory blocks 152, 154, and 156 of the memory device 150, e.g., a map flash operation, an operation of performing bad management on the memory device 150, e.g., a bad block management operation of performing a process by checking bad blocks in a plurality of memory blocks 152, 154, and 156 included in the memory device 150, or the like.

Figure 2:
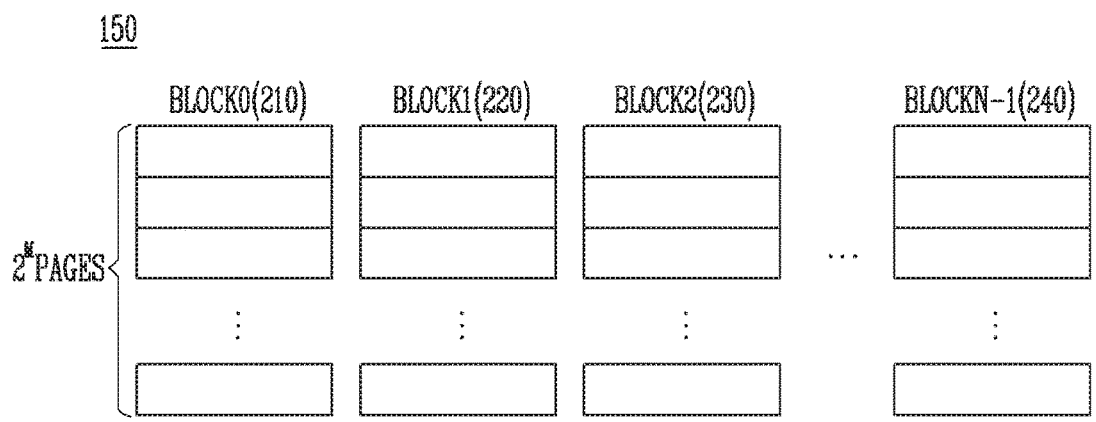
FIG. 2 is a diagram illustrating a memory device in a memory system in accordance with an embodiment of the present disclosure.

FIG. 2 is a diagram illustrating the memory device in the memory system in accordance with an embodiment of the present disclosure. FIG. 3 is a diagram illustrating an exemplary circuit of a memory cell array of memory blocks in the memory system in accordance with an embodiment of the present disclosure. FIG. 4 is a diagram illustrating an exemplary structure of the memory device in the memory system in accordance with an embodiment of the present disclosure.

The memory device in the memory system in accordance with one or more embodiments of the present disclosure is described in more detail with reference to FIGS. 2 to 4.

Referring to FIG. 2, the memory device 150 may include a plurality of memory blocks, e.g., BLOCK0 210, BLOCK1 220, BLOCK2 230, . . . and BLOCKN−1 240 (hereinafter, referred to as 'block 210 to 240'), each of which includes a plurality of pages, e.g., $2^M$ pages (labeled $2^M$PAGES in FIG. 2). For convenience of description, an arrangement in which each of the plurality of memory blocks includes $2^M$ pages is illustrated as an example, but each of the plurality of memory blocks may include a different number of pages, e.g., M pages. Each of the pages may include a plurality of memory cells to which a plurality of word lines are coupled.

Also, in the memory device 150, the plurality of memory blocks may include a single level cell (SLC) memory block, a multi-level cell (MLC), and the like based on the number of bits of data stored in one memory cell. Here, the SLC memory block may include a plurality of pages implemented by memory cells each storing data of one bit, and has fast data calculation performance and high durability. The MLC memory block may include a plurality of pages implemented by memory cells each storing multiple bits of data (e.g., two or more bits of data), and has a data storage space larger than that of the SLC memory block. The MLC memory block including a plurality of pages implemented by memory cells each storing data of three or four bits may be classified as a triple level cell (TLC) or quad level cell (QLC) memory block.

Each of the blocks 210 to 240 stores data provided from the host 102 through a write operation, and provides the stored data to the host 102 through a read operation.

Figure 3:
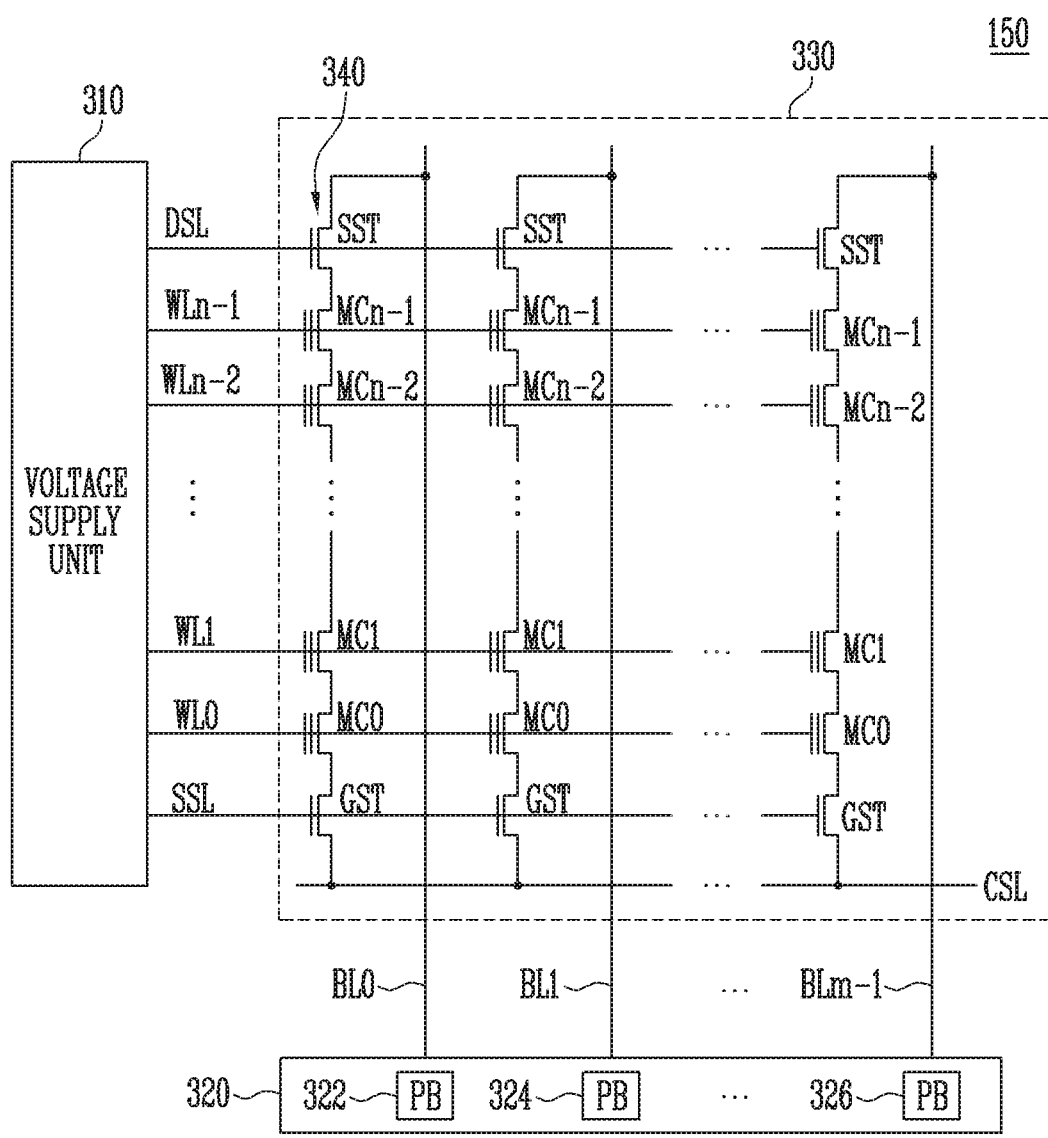
FIG. 3 is a diagram illustrating an exemplary circuit of a memory cell array of memory blocks in a memory system in accordance with an embodiment of the present disclosure.
Figure 4:
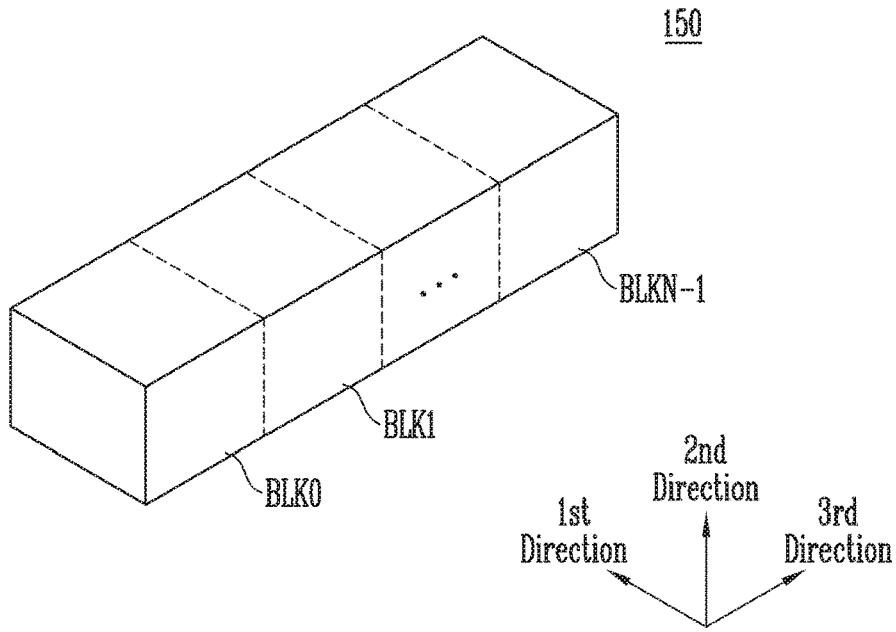
FIG. 4 is a diagram illustrating an exemplary structure of a memory device in a memory system in accordance with an embodiment of the present disclosure.

Referring to FIG. 3, in the plurality of memory blocks 152, 154, and 156 included in the memory device 150 of the memory system 110, each memory block 330 may include a plurality of cell strings 340 implemented as a memory cell array respectively coupled to bit lines BL0 to BLm−1. The cell string 340 of each column may include at least one drain select transistor SST, a plurality of memory cells MC0 to MCn−1, and at least one source select transistor GST. The plurality of memory cells MC0 to MCn−1 may be coupled in series between the select transistors SST and GST. Each of the memory cells MC0 to MCn−1 may be configured as an MLC that stores information on data of a plurality of bits per cell. The cell strings 340 may be electrically coupled to corresponding bit lines BL0 to BLm−1, respectively.

In FIG. 3, each memory block 330 configured as a NAND flash memory is illustrated by way of example only. However, the configuration of the plurality of memory blocks 152, 154, and 156 included in the memory device 150 is not limited to NAND flash memory. Rather, the memory block structure of memory device 150 may be implemented with a NOR flash memory, a hybrid flash memory in which at least two types of memory cells are combined, a One-NAND flash memory in which a controller is embedded in a memory chip, or the like. In addition, the memory block structure of memory device 150 may be implemented not only with a flash memory device in which a charge storage layer is configured with a conductive floating gate but also with a charge trap flash (CTF) memory device in which a charge storage layer is configured with an insulating layer, or the like.

A voltage supply unit 310 of the memory device 150 may provide word line voltages (e.g., a program voltage, a read voltage, a pass voltage, and the like) to be supplied to each of the word lines and a voltage to be supplied to a bulk (e.g., a well region) in which memory cells are formed based on an operation mode. In this case, a voltage generating operation of the voltage supply unit 310 may be performed under the control of a control circuit (not shown). Also, the voltage supply unit 310 may generate a plurality of variable read voltages to generate a plurality of read data. The voltage supply unit 310 may select one of memory blocks (or sectors) of the memory cell array and select one of word lines of the selected memory block in response to the control of the control circuit. The voltage supply unit 310 may provide a word line voltage to each selected word line and the other unselected word lines.

A read/write circuit 320 of the memory device 150 may be controlled by the control circuit and operate as a sense amplifier or a write driver based on an operation mode. For example, in a verify/normal read operation, the read/write circuit 320 may operate as a sense amplifier for reading data from the memory cell array. Also, in a program operation, the read/write circuit 320 may operate as a write driver for driving bit lines based on data to be stored in the memory cell array. In the program operation, the read/write circuit 320 may receive data to be written in the memory cell array from a buffer (not shown), and drive bit lines based on the received data. To this end, the read/write circuit 320 may include a plurality of page buffers (PB) 322, 324, and 326, respectively corresponding to columns (or bit lines) or column pairs (or bit line pairs). A plurality of latches (not shown) may be included in each of the page buffers 322, 324, and 326.

In addition, the memory device 150 may be implemented as a two-dimensional or three-dimensional memory device. In particular, the memory device 150 may be implemented as a nonvolatile memory device having a three-dimensional stack structure as shown in FIG. 4. When the memory device 150 is implemented in a three-dimensional structure, the memory device 150 may include a plurality of memory blocks BLK0 to BLKN−1. FIG. 4 is a block diagram illustrating the memory blocks 152, 154, and 156 of the memory device 150 shown in FIG. 1. Each of the memory blocks 152, 154, and 156 may be implemented in a three-dimensional structure (or vertical structure). For example, each of the memory blocks 152, 154, and 156 may include structures with dimensions extending along first to third directions, e.g., x-axis, y-axis, and z-axis directions, and be implemented in a three-dimensional structure.

Figure 5:
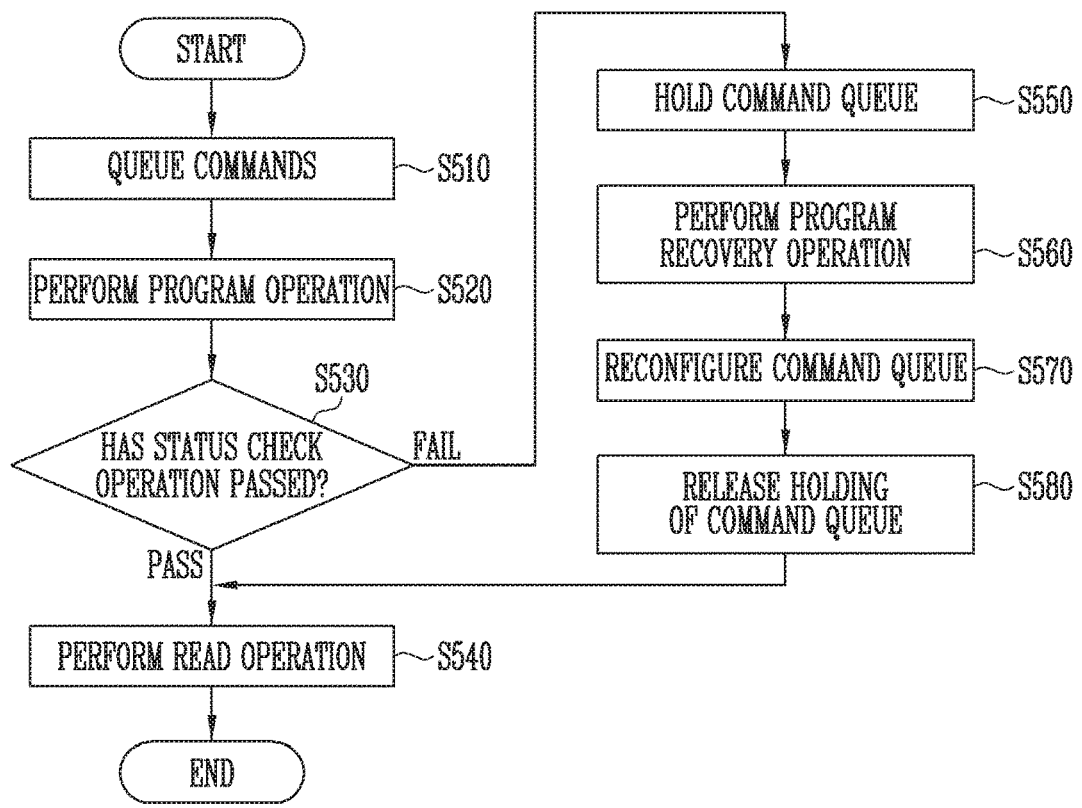
FIG. 5 is a flowchart illustrating an exemplary method for operating a memory system in accordance with an embodiment of the present disclosure.

FIG. 5 is a flowchart illustrating an exemplary method for operating a memory system in accordance with one or more embodiments of the present disclosure.

Such a method will be described with reference not only to FIG. 5, but to FIGS. 1 to 4 as well.

If a plurality of commands are input from the host 102, the processor 134 queues commands in the memory interface 142 by allowing the commands to be arranged in an order of priority, at step S510. In addition, data corresponding to a program command among the plurality of commands are stored in the memory 146.

The memory interface 142 generates control signals for operating the memory device 150 sequentially in response to the plurality of queued commands and processes the data. As an example, the memory interface 142 generates a plurality of control signals in response to the program command and transmits the generated control signals to the memory device. The memory interface 142 allows the data stored in the memory 146 to be transmitted to the memory device 150.

The memory device 150 programs the data to at least one selected memory block among the plurality of memory blocks 152, 154, and 156 in response to the control signals transmitted from the memory interface 142 in a program operation, at step S520.

The program operation may be performed in units of pages. If the program operation of a selected page is completed, the memory device 150 performs a program status check operation to determine whether the program operation has been successfully performed, e.g. whether the status check operation passed, at step S530.

If it is determined that the status check operation on the selected page has passed (that is, 'PASS' at step S530), the memory device 150 performs a program operation of a next page. If it is determined that the status check operation has passed after the program operation of the last page is completed, the memory device 150 ends the program operation.

After that, the memory interface 142 generates control signals for operating the memory device 150 in response to a command queued next to the program command and processes data. As an example, when the command queued next to the program command is a read command for just previously programmed data, the memory interface 142 generates the control signals for operating the memory device 150 in response to the read command. The memory device reads data stored in the selected memory block and stores the read data in the page buffers (PB) 322, 324, and 326 and stores the stored data in the memory, at step S540. The data stored in the memory 146 are output to the host 102.

Returning to step S530 in FIG. 5, if the status check operation performed indicates that the program operation has failed (that is, 'FAIL' at step S530), the memory device 150 outputs a program status signal P/S that is a status check operation result, which in this instance, is indicative of program operation failure, and the queue holding controller 144 holds a control signal generating operation of the memory interface 142 in response to the program status signal P/S. That is, when it is determined that the status check operation has failed indicating failure of the program operation, the queue holding controller 144 holds the control signal generating operation of the memory interface 142, at step S550.

When it is determined that the program operation has failed as indicated by the status check operation result of the memory device 150, the processor 134 controls the memory device 150 to perform a recovery operation. That is, the processor 134 controls the memory interface 142 to perform a recovery operation based on stored firmware, and the memory interface 142 outputs control signals corresponding to the recovery operation to the memory device 150.

If it is determined that the program operation has failed as indicated by the status check operation result of the memory device 150, the memory device 150 transmits data stored in already programmed pages in the selected memory block on which program operation has failed to a new memory block and programs the data to the new memory block. That is, the memory device 150 transmits data stored in pages of which program operation has passed in the selected memory block on which program operation has failed to a new memory block and programs the data to the new memory block. After that, the memory device 150 performs a recovery operation by transmitting data of a page on which program operation has failed to a new memory block, using the data stored in the page buffers (PB) 322, 324, and 326, and programming the data to the new memory block, at step S560.

The processor 134 reads the queued command stored in the memory interface 142 after the recovery operation of the memory device 150, and checks whether, among the read commands, there is a read command for a memory block on which program operation has failed. At this time, when such a read command exists, the processor 134 corrects the memory block corresponding to the read command as a new recovered memory block, and newly queues the plurality of commands including the corrected read command in the memory interface 142 to be reconfigured, at step S570.

After the commands including the corrected read command are newly queued or re-queued in the memory interface 142, the queue holding controller 144 controls the held memory interface 142 to be re-operated, at step S580. Therefore, the memory interface 142 generates control signals based on the newly queued commands and outputs the generated control signals to the memory device 150. For example, when the program operation is completed after the recovery operation, and a next queued command is a read command for just previously programmed data, the memory interface 142 generates control signals for operating the memory device 150 in response to the read command. The memory device 150 reads data stored in the selected memory block and stores the read data in the page buffers (PB) 322, 324, and 326. The stored data are stored in the memory 146, at step S540.

To summarize, in accordance with one or more embodiments of the present disclosure, when the program operation has failed as indicated by the status check operation result, queued commands are held. When a read command exists among queued commands after the recovery operation of the memory device 150, the address of the read command is corrected to include the position of a new recovered memory block, so that data recovered in the read operation can be read, thereby improving the reliability of data.

Figure 6:
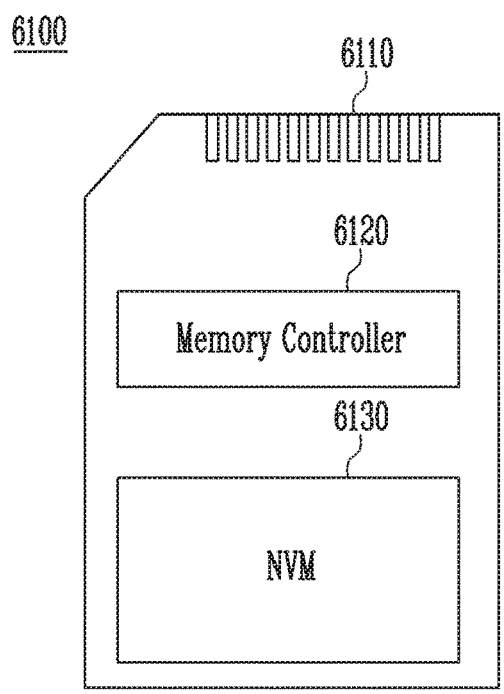
FIGS. 6 to 9 are diagrams illustrating other examples of a data processing system including a memory system in accordance with an embodiment of the present disclosure.

FIG. 6 is a diagram schematically illustrating an example of the data processing system including the memory system in accordance with an embodiment of the present disclosure, and more particularly illustrating a memory card system to which the memory system of the present disclosure may be applied.

Referring to FIG. 6, the memory card system 6100 includes a memory controller 6120, a memory device 6130, and a connector 6110.

More specifically, the memory controller 6120 is coupled to, and configured to access, the memory device 6130, which may be implemented with a nonvolatile memory. For example, the memory controller 6120 is configured to control a read operation, a write operation, an erase operation, a background operation, and the like. Also, the memory controller 6120 is configured to provide an interface between the memory device 6130 and a host. The memory controller 6120 may be configured to drive firmware for controlling the memory device 6130. That is, the memory controller 6120 may correspond to the controller 130 in the memory system 110 described in FIG. 1, and the memory device 6130 may correspond to the memory device 150 in the memory system 110 described in FIG. 1.

Accordingly, the memory controller 6120 may include components such as a random access memory (RAM), a processing unit, a host interface, a memory interface, an ECC unit, and a queue holding control unit.

In addition, the memory controller 6120 may communicate with an external device, e.g., the host 102 described in FIG. 1 through the connector 6110. For example, the memory controller 6120, as described in FIG. 1, may be configured to communicate with the external device through at least one of various communication protocols such as such as a universal serial bus (USB) protocol, a multimedia card (MMC) protocol, a peripheral component interconnection (PCI) protocol, a PCI-Express (PCI-E) protocol, an advanced technology attachment (ATA) protocol, a Serial-ATA protocol, a Parallel-ATA protocol, a small computer system interface (SCSI) protocol, an enhanced small disk interface (ESDI) protocol, an integrated drive electronics (IDE) protocol, FireWire, a universal flash storage (UFS) protocol, Wi-Fi, and Bluetooth. Accordingly, the memory system and the data processing system in accordance with one or more embodiments of the present disclosure can be applied to wired/wireless electronic devices, particularly, mobile electronic devices and the like.

In addition, the memory device 6130 may be implemented with a nonvolatile memory. For example, the memory device 6130 may be implemented with various nonvolatile memory devices such as an electrically erasable and programmable ROM (EPROM), a NAND flash memory, a NOR flash memory, a phase-change RAM (PRAM), a resistive RAM (ReRAM), a ferroelectric RAM (FRAM), and a spin-torque magnetic RAM (STT-MRAM).

In addition, the memory controller 6120 and the memory device 6130 may be integrated into a single semiconductor device. As an example, the memory controller 6120 and the memory device 6130 may be integrated into a single semiconductor device to constitute a solid state drive (SSD). The memory controller 6120 and the memory device 6130 may be integrated into a single semiconductor device to constitute a memory card such as a PC card (PCMCIA), a compact flash card (CF), a smart media card (SM, SMC), a memory stick, a multimedia card (MMC, RS-MMC, MMCmicro), an SD card (SD, mini-SD, micro-SD, SDHC) or a universal flash storage (UFS).

Figure 7:
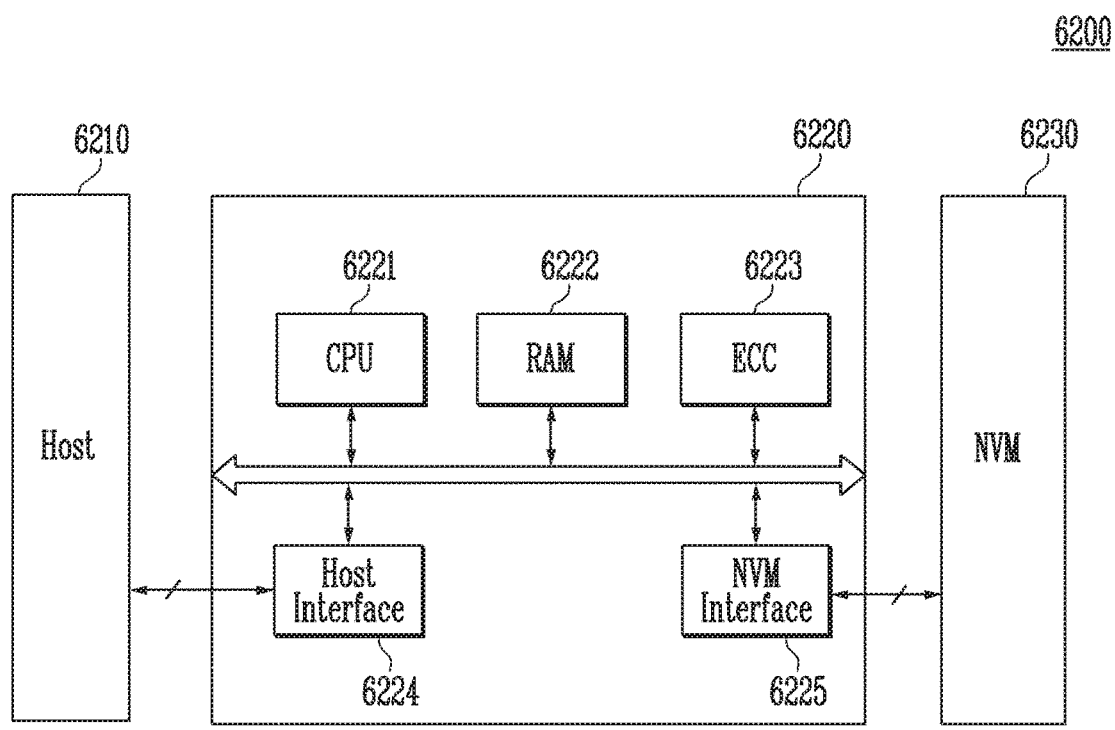

FIG. 7 is a diagram schematically illustrating another example of the data processing system including the memory system in accordance with an embodiment of the present disclosure.

Referring to FIG. 7, the data processing system 6200 includes a memory device 6230 implemented with at least one nonvolatile memory and a memory controller 6220 that controls the memory device 6230. Here, the data processing system 6200 shown in FIG. 7, as described in FIG. 1, may be a storage medium such as a memory card (CF, SD, micro-SD, etc.) or a USB storage. The memory device 6230 may correspond to the memory device 150 in the memory system 110 described in FIG. 1, and the memory controller 6220 may correspond to the controller 130 in the memory system 110 described in FIG. 1.

In addition, the memory controller 6220 controls a read operation, a write operation, an erase operation, and the like on the memory device 6230 in response to a request of a host 6210, and the memory controller 6220 includes at least one CPU 6221, a buffer memory, e.g., a RAM 6222, an ECC circuit 6223, a host interface 6224, and a memory interface, e.g., an NVM interface 6225. In addition, the queue holding controller 144 of FIG. 1 may be included in the NVM interface 6225 and hold an operation of the NVM interface 6225 when a program operation fails.

The CPU 6221 may control overall operations of the memory device 6230, e.g., read, write, file system management, bad page management, and the like. In addition, the RAM 6222 operates based on the control of the CPU 6221, and may be used as a work memory, a buffer memory, a cache memory, or the like. When the RAM 6222 is used as a work memory, data processed by the CPU 6221 may be temporarily stored. When the RAM 6222 is used as a buffer memory, the RAM 6222 may be used to buffer data transmitted from the host 6210 to the memory device 6230 or data transmitted from the memory device 6230 to the host 6210. When the RAM 6222 is used as a cache memory, the RAM 6222 may be used to allow the low-speed memory device 6230 to operate at high speed.

In addition, the ECC circuit 6223 corresponds to the ECC unit 138 of the controller 130 described in FIG. 1, and generates an error correction code (ECC) for correcting a fail bit or error bit of data received from the memory device 6230 as described in FIG. 1. Also, the ECC circuit 6223 performs error correction encoding on data provided to the memory device 6230 to generate data to which a parity bit is added. Here, the parity bit may be stored in the memory device 6230. Also, the ECC circuit 6223 may perform error correction decoding on data output from the memory device 6230. In this case, the ECC circuit 6223 may correct an error using a parity. For example, the ECC circuit 6223, as described in FIG. 1, may correct an error using various coded modulations such as LDPC code, BCH code, turbo code, Reed-Solomon code, convolution code, RSC, TCM, and BCM.

In addition, the memory controller 6220 communicates data, and the like with the host 6210 through the host interface 6224, and communicates data, and the like with the memory device 6230 through the NVM interface 6225. Here, the host interface 6225 may be coupled to the host 6210 through a PATA bus, SATA bus, SCSI, USB, PCIe, a NAND interface, and the like. Also, the memory controller 6220 may be coupled to the external device, e.g., the host 6210 or another external device except the host 6210 as a wireless communication function, Wi-Fi or long term evolution (LTE) as a mobile communication standard, or the like is implemented, and then communicate data, and the like, with the external device. In particular, the memory controller 6220 is configured to communicate with the external device through at least one of various communication standards. Accordingly, the memory system and the data processing system in accordance with one or more embodiments of the present disclosure can be applied to wired/wireless electronic devices, particularly, mobile electronic devices, and the like.

Figure 8:
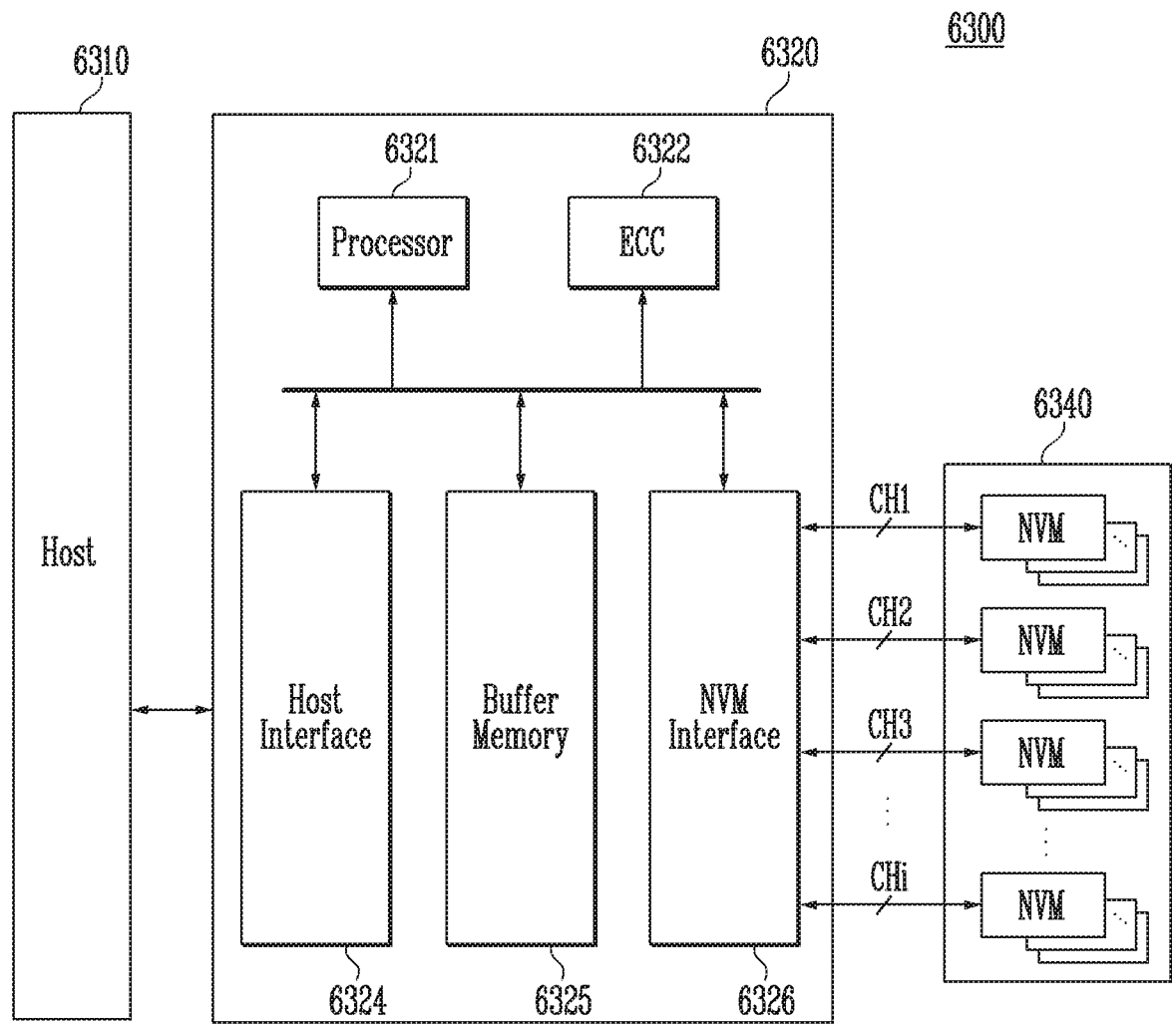

FIG. 8 is a diagram schematically illustrating another example of the data processing system including the memory system in accordance with an embodiment of the present disclosure, and more particularly illustrating a solid state drive (SSD) to which the memory system is applied.

Referring to FIG. 8, the SSD 6300 includes a memory device 6340 including a plurality of nonvolatile memories and a controller 6320. The controller 6320 may correspond to the controller 130 in the memory system 110 described in FIG. 1, and the memory device 6340 may correspond to the memory device 150 in the memory system 110 described in FIG. 1.

More specifically, the controller 6320 is coupled to the memory device 6340 through a plurality of channels CH1, CH2, CH3, . . . , and CHi. Also, the controller 6320 includes at least one processor 6321, a buffer memory 6325, an ECC circuit 6322, a host interface 6324, and a memory interface, e.g., a nonvolatile memory interface 6326. The nonvolatile memory interface 6326 may be configured to include the queue holding controller 144 of FIG. 1.

The buffer memory 6325 temporarily stores data received from a host 6310 or data received from a plurality of flash memories NVMs included in the memory device 6340, or temporarily stores meta data of the plurality of flash memories NVMs, e.g., map data included in a mapping table. Also, the buffer memory 6325 may be implemented with volatile memories such as DRAM, SDRAM, DDR SDRAM, LPDDR SDRAM, SRAM, and GRAM or nonvolatile memories such as FRAM ReRAM, STT-MRAM, and PRAM. For convenience of description, an example in which the buffer memory 6325 is inside the controller 6320 is illustrated in FIG. 8, but the buffer memory 6325 may be outside the controller 6320.

The ECC circuit 6322 calculates an error correction code value of data to be programmed to the memory device 6340 in a program operation, performs an error correction operation on data read from the memory device 6340 in a read operation, based on the error correction code value, and performs an error correction operation on data restored from the memory device 6340 in a restore operation of fail data.

In addition, the host interface 6324 provides an interface function between the controller 6320 and an external device, e.g., the host 6310, and the nonvolatile memory interface 6326 provides an interface function between the controller 6320 and the memory device 6340 coupled to the controller 6320 through the plurality of channels.

In addition, the SSD 6300 to which the memory system 110 described in FIG. 1 may be applied in multiple instances to implement a data processing system, e.g., a redundant array of independent disks (RAID) system. In this case, a plurality of SSDs 6300 and a RAID controller that controls the plurality of SSDs 6300. When a program operation is performed by receiving a write command from the host 6310, the RAID controller may select at least one memory system, i.e., an SSD 6300 among the plurality of SSDs 6300, corresponding to a plurality of RAID levels, i.e., RAID level information of the write command received from the host 6310, and then output data corresponding to the write command to the selected SSD 6300. Also, when a read operation is performed by receiving a read command from the host 6310, the RAID controller may select at least one memory system, i.e., an SSD 6300 among the plurality of SSDs 6300, corresponding to a plurality of RAID levels, i.e., RAID level information of the read command received from the host 6310, and then provided data from the selected SSD 6300 to the host 6310.

Figure 9:
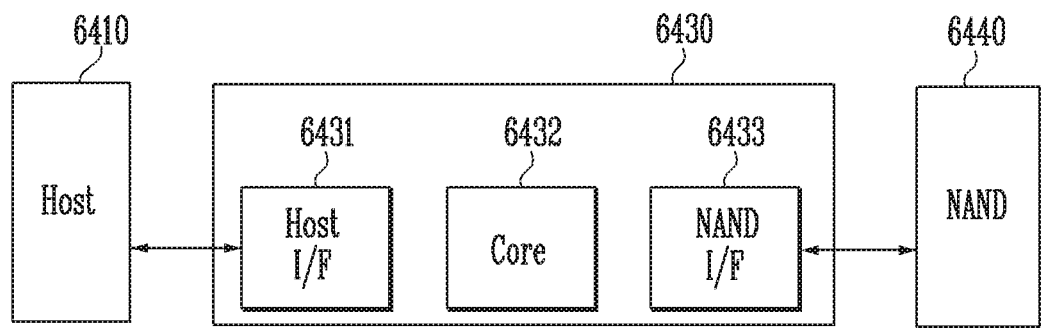

FIG. 9 is a diagram schematically illustrating another example of the data processing system including the memory system in accordance with an embodiment of the present disclosure, and more particularly illustrating an embedded multimedia card (eMMC) to which the memory system is applied.

Referring to FIG. 9, the eMMC 6400 includes a memory device 6440 implemented with at least one NAND flash memory and a controller 6430. Here, the controller 6430 may correspond to the controller 130 in the memory system 110 described in FIG. 1, and the memory device 6440 may correspond to the memory device 150 in the memory system 110 described in FIG. 1.

More specifically, the controller 6430 is coupled to the memory device 6440 through a plurality of channels. Also, the controller 6430 includes at least one core 6432, a host interface 6431, and a memory interface, e.g., a NAND interface 6433. The NAND interface 6433 may be configured to include the queue holding controller 144 of FIG. 1.

Here, the core 6432 controls overall operations of the eMMC 6400, the host interface 6431 provides an interface function between the controller 6430 and a host 6410, and the NAND interface 6433 provides an interface function between the memory device 6440 and the controller 6430. For example, the host interface 6431, as described in FIG. 1, may be a parallel interface, e.g., an MMC interface. In addition, the host interface 6431 may be a serial interface, e.g., an ultra high speed (UHS)-I/UHS-II, UFS interface.

In accordance with one or more embodiments of the present disclosure, when a program operation of the memory system fails, a recovery operation is performed after queued commands are held. The held commands are released after the address of a read command among the held commands is changed to the recovered position, thereby improving the reliability of data.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it is to be understood by those of skill in the art that various changes in form and details may be made without departing from the spirit and scope of the present disclosure as set forth in the following claims.

What is claimed is:

1. A memory system comprising:
   a controller configured to queue a plurality of commands and output control signals in response to the plurality of queued commands; and
   a memory device configured to perform a program operation in response to the control signals,
   wherein, when the program operation fails, the controller holds the plurality of queued commands and then corrects a position corresponding to a read command, among the plurality of commands, to a recovery position.

2. The memory system of claim 1, wherein the controller includes:
   a processor configured to queue the plurality of commands that are input from a host;
   a NAND flash controller configured to store the plurality of queued commands, and generate and output the control signals based on an order in which the plurality of commands are queued; and
   a queue holding controller configured to receive a program status signal from the memory device, the program status signal being indicative of the success or failure of the program operation, the queue holding controller being further configured to hold an operation of the NAND flash controller when the program status signal indicates failure of the program operation.

3. The memory system of claim 2, wherein, when the program operation fails, the processor controls the NAND flash controller to perform a recovery operation of the memory device.

4. The memory system of claim 3, wherein, after the recovery operation is performed, when there is a read command, among the plurality of commands stored in the NAND flash controller, corresponding to a position at which the program operation fails, the processor corrects the position of the read command to the recovery position.

5. The memory system of claim 3, wherein the processor reads the plurality of commands stored in the NAND flash controller, and when, among the plurality of commands read by the processor, there is a read command corresponding to a position at which the program operation fails, the processor corrects the position of the read command to the recovery position, and re-queues the plurality of commands including the corrected read command in the NAND flash controller.

6. The memory system of claim 5, wherein, after the plurality of commands including the corrected read command are re-queued in the NAND flash controller, the queue holding controller releases the held operation of the NAND flash controller.

7. The memory system of claim 3, wherein the memory device:
   reads data on which the program operation is completed in the recovery operation and programs the read data to a new memory block; and
   programs data on which the program operation failed to the new memory block, using data stored in a page buffer of the memory device.

8. The memory system of claim 2, wherein the memory device performs the program operation in units of pages, and performs a status check operation for each page indicative of the success or failure of the program operation on that page, and then outputs the program status signal.

9. A memory system comprising:
   a controller configured to queue a plurality of commands and output control signals in response to the plurality of queued commands; and
   a memory device configured to perform a program operation in response to the control signals,
   wherein, when the program operation fails, the memory device stores data in a new memory block by performing a recovery operation,
   wherein the controller holds the plurality of queued commands and then corrects a position corresponding to a read command, among the plurality of commands, to a position of the new memory block.

10. The memory system of claim 9, wherein the controller includes:
    a processor configured to queue the plurality of commands that are input from a host;
    a NAND flash controller configured to store the plurality of queued commands, and generate and output the control signals based on an order in which the plurality of commands are queued; and
    a queue holding controller configured to receive a program status signal from the memory device, the program status signal being indicative of the success or failure of the program operation, the queue holding controller being further configured to hold an operation of the NAND flash controller when the program status signal indicates failure of the program operation.

11. The memory system of claim 10, wherein the processor reads the plurality of commands stored in the NAND flash controller, and when, among the plurality of commands read by the processor, there is a read command corresponding to a position at which the program operation fails, the processor corrects the position of the read command to the position of the new memory block, and re-queues the plurality of commands including the corrected read command in the NAND flash controller.

12. The memory system of claim 11, wherein, after the plurality of commands including the corrected read command are re-queued in the NAND flash controller, the queue holding controller releases the held operation of the NAND flash controller.

13. The memory system of claim 10, wherein the memory device performs the program operation in units of pages, and performs a status check operation for each page indicative of the success or failure of the program operation on that page, and then outputs the program status signal.

14. The memory system of claim 9, wherein the memory device:
    reads data on which the program operation is completed in the recovery operation and programs the read data to a new memory block; and
    programs data on which the program operation failed to the new memory block, using data stored in a page buffer of the memory device.

15. A method for operating a memory system, the method comprising:
    queuing a plurality of commands input from a host in a controller;
    generating control signals according to an order of the plurality of commands queued in the controller, and performing operations of a memory device, including a program operation, based on the control signals; and
    when the program operation fails, holding the generating of the control signals and performing a recovery operation of the memory device; and
    checking whether there is a read command among the plurality of queued commands, and, when the read command exists, correcting a position corresponding to the read command to a recovery position and then re-queuing the plurality of commands including the corrected read command.

16. The method of claim 15, comprising, after re-queuing the plurality of commands including the corrected read command, re-performing the generating of the held control signals.

17. The method of claim 15, wherein, when the program operation fails, a program status signal indicative of the program operation failure is generated, and the generating of the control signals is held in response to the program status signal.

18. The method of claim 15, wherein the recovery operation:
    reads data on which the program operation is completed in the memory device and programs the read data to a new memory block; and
    programs data on which the program operation failed to the new memory block, using data stored in a page buffer of the memory device.

19. The method of claim 18, wherein the recovery position is a position of the new memory block.

* * * * *